(12) United States Patent
Laituri et al.

(10) Patent No.: US 6,682,094 B1
(45) Date of Patent: Jan. 27, 2004

(54) RESTRAINT SYSTEM

(75) Inventors: Tony Ray Laituri, Dearborn, MI (US); David J. Bauch, South Lyon, MI (US); David Webster Clark, Troy, MI (US); Mark Anthony Cuddihy, New Boston, MI (US); Matt Alan Niesluchowski, Troy, MI (US); Rouaa Nakhleh, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 09/648,359

(22) Filed: Aug. 25, 2000

(51) Int. Cl.⁷ ............................................... B60R 21/32
(52) U.S. Cl. ..................................................... 280/735
(58) Field of Search .................................. 280/734, 735

(56) References Cited

U.S. PATENT DOCUMENTS

| | | | |
|---|---|---|---|
| 3,162,485 A | 12/1964 | Prangnell et al. | 297/389 |
| 4,236,755 A | 12/1980 | Pollitt et al. | 297/483 |
| 5,123,673 A | 6/1992 | Tame | 280/801 |
| 5,265,910 A | 11/1993 | Barr et al. | 280/808 |
| 5,389,824 A * | 2/1995 | Moroto et al. | 280/735 |
| 5,400,487 A * | 3/1995 | Gioutsos et al. | 280/735 |
| 5,413,378 A * | 5/1995 | Steffens, Jr. et al. | 280/735 |
| 5,460,405 A * | 10/1995 | Faigle et al. | 280/735 |
| 5,785,347 A * | 7/1998 | Adolph et al. | 280/735 |
| 6,036,225 A * | 3/2000 | Foo et al. | 280/735 |
| 6,088,639 A * | 7/2000 | Fayyad et al. | 280/735 |
| 6,168,197 B1 * | 1/2001 | Paganini et al. | 280/735 |

FOREIGN PATENT DOCUMENTS

| | | | |
|---|---|---|---|
| AU | 3781595 | 5/1997 | 22/12 |
| EP | 0950582 A2 | 10/1999 | |
| GB | 2005887 A | 10/1977 | |
| GB | 2248332 A | 4/1992 | |
| JP | 277345 | 3/1990 | |
| JP | 5139245 | 6/1993 | |
| JP | 6255445 | 9/1994 | |
| JP | 7291092 | 11/1995 | |
| WO | WO 01/17825 A1 | 3/2001 | |
| WO | WO 01/21448 A1 | 3/2001 | |

* cited by examiner

Primary Examiner—Eric Culbreth
(74) Attorney, Agent, or Firm—David B. Kelley

(57) ABSTRACT

A restraint system for a motor vehicle includes a plurality of sensors for sensing vehicle conditions of restraint deployment thresholds. The restraint system also includes an electronic controller electrically connected to the sensors for determining whether one of the sensors experiences sufficient deceleration. The restraint system further includes at least one inflatable restraint operatively connected to the electronic controller for deployment thereby in a first stage if the deceleration warrants a first stage deployment and in a second stage if the deceleration warrants a second stage deployment when the sensors sense vehicle conditions achieving the restraint deployment thresholds to restrain an occupant in a seat of the motor vehicle.

15 Claims, 6 Drawing Sheets

Table 1

| | DRIVER | | | | PASSENGER | | | | | |
|---|---|---|---|---|---|---|---|---|---|---|
| | Seat Forward | | Seat Rearward | | Above Weight | | Below Weight | | Empty | |
| Sensor Threshold Reached | Unbelted | Belted | Unbelted | Belted | Unbelted | Belted | Unbelted | Belted | Unbelted | Belted |
| Pretensioner | | X | | X | | X | | X | | |
| Unbelted Stage 1 | X | | X | | X | | | | | |
| Unbelted Stage 2 | | | X | | X | | | | | |
| Belted Stage 1 | | X | | X | | X | | | | |
| Belted Stage 2 | | | | X | | X | | | | |

X = Deploy

FIG. 10.

RESTRAINT SYSTEM

BACKGROUND OF THE INVENTION

1. Field of the Invention

The present invention relates generally to restraints for motor vehicles and, more specifically, to a restraint system for a motor vehicle.

2. Description of the Related Art

It is known to provide seats for a motor vehicle. It is also known to provide a restraint system such as a seat belt restraint to restrain an occupant in a seat of the motor vehicle. Typically, the belt restraint includes a retractor attached to the seat or vehicle structure and attached to the seat belt. The belt restraint also includes a latch plate attached to one end of the seat belt and a buckle attached by belt webbing to the seat or vehicle structure. The belt restraint is buckled and unbuckled by engagement and disengagement between the latch plate and buckle.

It is further known to provide an inflatable restraint for an occupant in a motor vehicle, which is commonly referred to as an air bag. The air bag is stored in the motor vehicle in an un-inflated condition. When the motor vehicle experiences a collision-indicating condition of at least a predetermined threshold level, gas is directed to flow into the air bag from a gas-producing source. The gas inflates the air bag to an extended condition in which the air bag extends into the occupant compartment of the motor vehicle. When the air bag is inflated into the occupant compartment, it restrains movement of the occupant to help protect the occupant from forcefully striking stiffer elements of the motor vehicle interior as a result of the collision.

Although the above restraints have worked, it is desirable to provide a restraint system for positively restraining an occupant in the motor vehicle. It is also desirable to provide a restraint system that takes into account the position of the seat, weight of the occupant, and impact severity to deploy an inflatable restraint. Therefore, there is a need in the art to provide a restraint system for a motor vehicle that meets these desires.

SUMMARY OF THE INVENTION

Accordingly, the present invention is a restraint system for a motor vehicle. The restraint system includes a plurality of sensors for sensing vehicle conditions of restraint deployment thresholds. The restraint system also includes an electronic controller electrically connected to the sensors for determining whether one of the sensors experiences sufficient deceleration. The restraint system further includes at least one inflatable restraint operatively connected to the electronic controller for deployment thereby in a first stage if the deceleration warrants a first stage deployment and in a second stage if the deceleration warrants a second stage deployment when the sensors sense vehicle conditions achieving the restraint deployment thresholds to restrain an occupant in a seat of the motor vehicle.

In addition, the present invention is a method of deploying an inflatable restraint of a restraint system for a vehicle. The method includes the step of setting restraint deployment thresholds based on belt status of the restraint system. The method also includes the step of determining whether a sensor experiences sufficient deceleration to warrant either a first stage deployment or a second stage deployment of the inflatable restraint. The method includes the step of verifying deceleration from a separate sensor. The method further includes the step of deploying a first stage of the inflatable restraint if the deceleration warrants a first stage deployment and deploying a second stage of the inflatable restraint if the deceleration warrants a second stage of deployment.

One advantage of the present invention is that a new restraint system is provided for a motor vehicle that positively restrains an occupant in a seat of the motor vehicle. Another advantage of the present invention is that the restraint system takes into account the position of the seat, weight of the occupant, and severity of the impact in determining inflation of an inflatable restraint. Yet another advantage of the present invention is that the restraint system determines whether the occupant is buckled in a seat belt restraint for determining whether to activate a seat belt pretensioner.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 10 is a table of conditions of deployment of the restraint system of FIG. 1.

DESCRIPTION OF THE PREFERRED EMBODIMENT(S)

Figure 2:
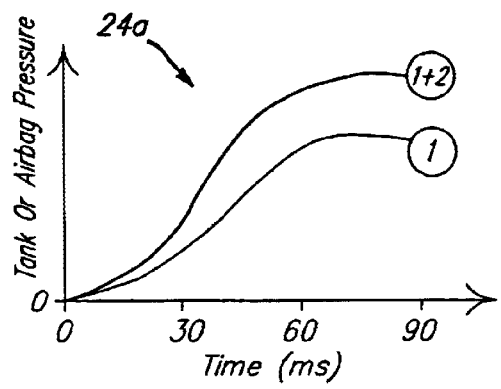
FIG. 2 is a graph of vessel pressure versus time for a driver side inflator of the restraint system of FIG. 1.
Figure 3:
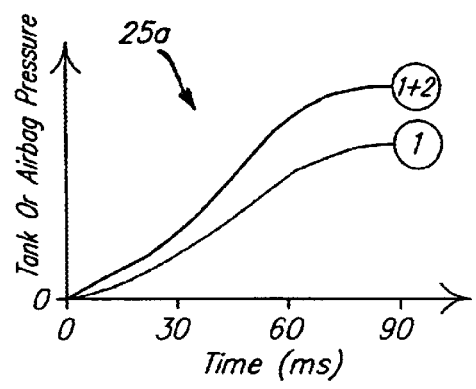
FIG. 3 is a graph of vessel pressure versus time for a passenger side inflator of the restraint system of FIG. 1.
Figure 4:
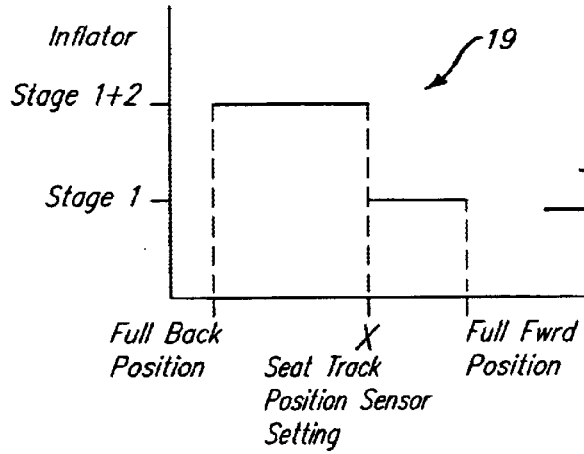
FIG. 4 is a graph of inflator stage versus seat position for a driver side inflator of the restraint system of FIG. 1.

Referring to the drawings and in particular FIGS. 1 through 7, one embodiment of a restraint system 10, according to the present invention, is illustrated for a motor vehicle, generally indicated at 12. The restraint system 10 is used to restrain an occupant (not shown) such as a human in either one of a pair of seats 14 located within an occupant compartment 16 of the motor vehicle 12. The seats 14 are for a driver side and passenger side of the motor vehicle 12. The restraint system 10 includes a driver seat position sensor 18 operatively connected to structure of the driver side seat 14 such as a seat track (not shown). As illustrated in FIG. 4, a graph 19 is shown for activating the stages of an inflator 22 by an electronic controller 20 to be described based on a position of the driver side seat 14. It should be appreciated that the controller 20 activates only stage 1 of the inflator 22 when the position of the driver side seat 14 is near a full forward position. It should be appreciated that the seats 14 are conventional and known in the art.

The restraint system 10 includes an electronic controller 20 electrically connected to the driver seat position sensor 18. The electronic controller 20 is described in detail in connection with FIG. 7. It should be appreciated that the electronic controller 20 is conventional and known in the art.

Figure 1:
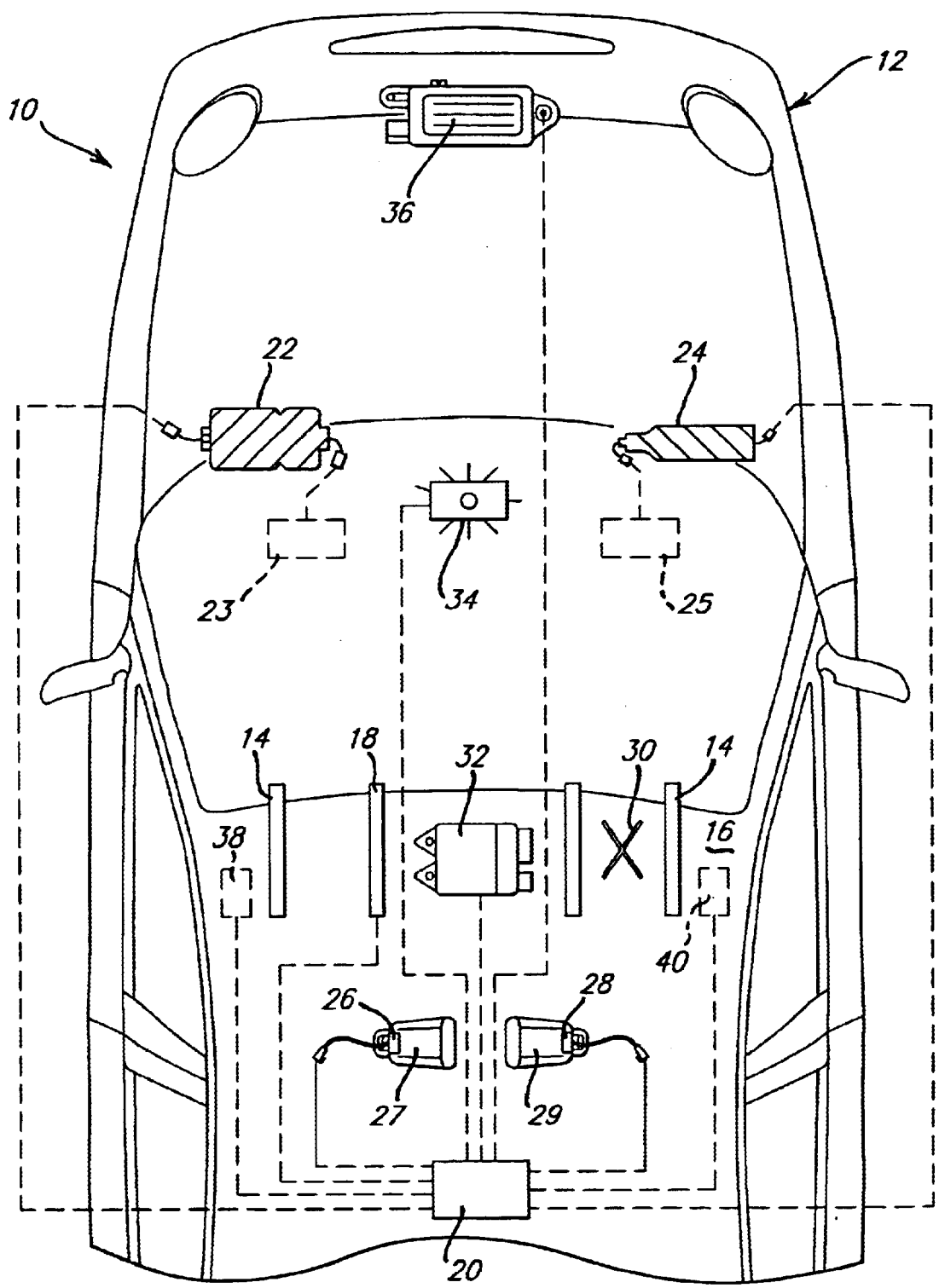
FIG. 1 is a plan diagrammatic view of a restraint system, according to the present invention, illustrated in operational relationship with a motor vehicle.

The restraint system 10 also includes at least one, preferably a plurality of inflators 22 and 24, electrically connected to the electronic controller 20. As illustrated in FIG. 1, the inflator 22 is of a dual stage type for an inflatable restraint such as a driver side air bag 23 and the inflator 24 is of a dual stage type for an inflatable restraint such as a passenger side air bag 25. As illustrated in FIGS. 2 and 3, graphs 24a and 25a, respectively, are shown for vessel pressure (psi) versus time (milliseconds) for two stages of the inflators 22 and 24 deployed in a rigid vessel (not shown) to show the pressure making capacity. It should be appreciated that the inflators 22 and 24 produce gas mass and therefore make higher airbag pressures for both stages 1 and 2 than for stage 1 alone. It should also be appreciated that the inflators 22 and 24 and air bags 24 and 25 are conventional and known in the art.

The restraint system 10 includes at least one, preferably a pair of seat buckle switches 26 and 28 of a seat belt restraint (partially shown) electrically connected to the electronic controller 20. As illustrated in FIG. 1, the seat belt buckle switch 26 is for a driver side seat belt restraint buckle 27 and the seat belt buckle switch 28 is for a passenger side seat belt restraint buckle 29. It should be appreciated that the seat belt buckle switches 26 and 28 and seat belt restraint buckles 27 and 29 are conventional and known in the art.

Figure 5:
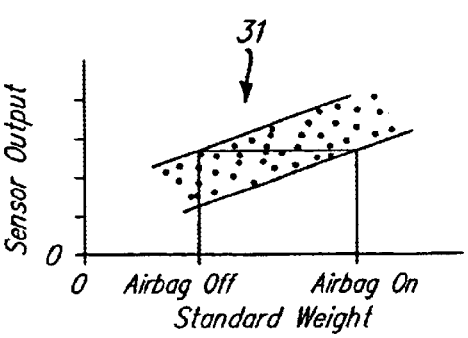
FIG. 5 is a graph of sensor output versus standard weight for a passenger side seat of the restraint system of FIG. 1.

The restraint system 10 further includes a passenger seat weight sensor 30 connected to the passenger side seat 14 and electrically connected to the electronic controller 20. The weight sensor 30 senses the weight of the occupant in the passenger side seat 14. As illustrated in FIG. 5, a graph 31 is shown of sensor output versus standard weight of an occupant for activating the inflator 24 by the controller 20. It should be appreciated that the weight sensor 30 is conventional and known in the art.

Figure 6:
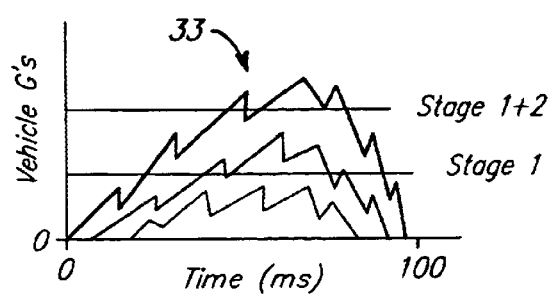
FIG. 6 is a graph of vehicle G's versus time for the restraint system of FIG. 1.

The restraint system 10 includes an impact severity sensor 32 electrically connected to the electronic controller 20. The impact severity sensor 32 senses the severity of a vehicle impact by measuring vehicle deceleration (G's) over time for the vehicle 12. As illustrated in FIG. 6, a graph 33 shows vehicle deceleration (G's) versus time (milliseconds) for activating the stages of the inflators 22 and 24 by the electronic controller 20. It should be appreciated that the impact severity sensor 32 is conventional and known in the art. It should also be appreciated that the impact severity sensor 32 may be contained within the electronic controller 20.

The restraint system 10 also includes a passenger air bag status light 34 connected to an instrument panel (not shown) and electrically connected to the electronic controller 20. The status light 34 is an ON/OFF light that indicates whether the passenger side air bag 25 is activated. It should be appreciated that the status light 34 is conventional and known in the art.

The restraint system 10 includes an electronic satellite sensor 36 electrically connected to the electronic controller 20. The electronic satellite sensor 36 is used to sense or verify vehicle impact. It should be appreciated that the electronic satellite sensor 36 is used to discriminate in conjunction with deceleration from the impact severity sensor 32. It should also be appreciated that the electronic satellite sensor 36 is conventional and known in the art.

The restraint system 10 further includes a driver side belt pretensioner 38 connected to the seat belt of the driver side seat belt restraint and electrically connected to the electronic controller 20. The restraint system 10 includes a passenger side belt pretensioner 40 connected to the seat belt of the passenger side seat belt restraint and electrically connected to the electronic controller 20. The electronic controller 20 activates the belt pretensioners 38 and 40 when a sufficient deceleration is sensed to warrant pretensioner deployment. It should be appreciated that the belt pretensioners 38 and 40 are conventional and known in the art.

Figure 7:
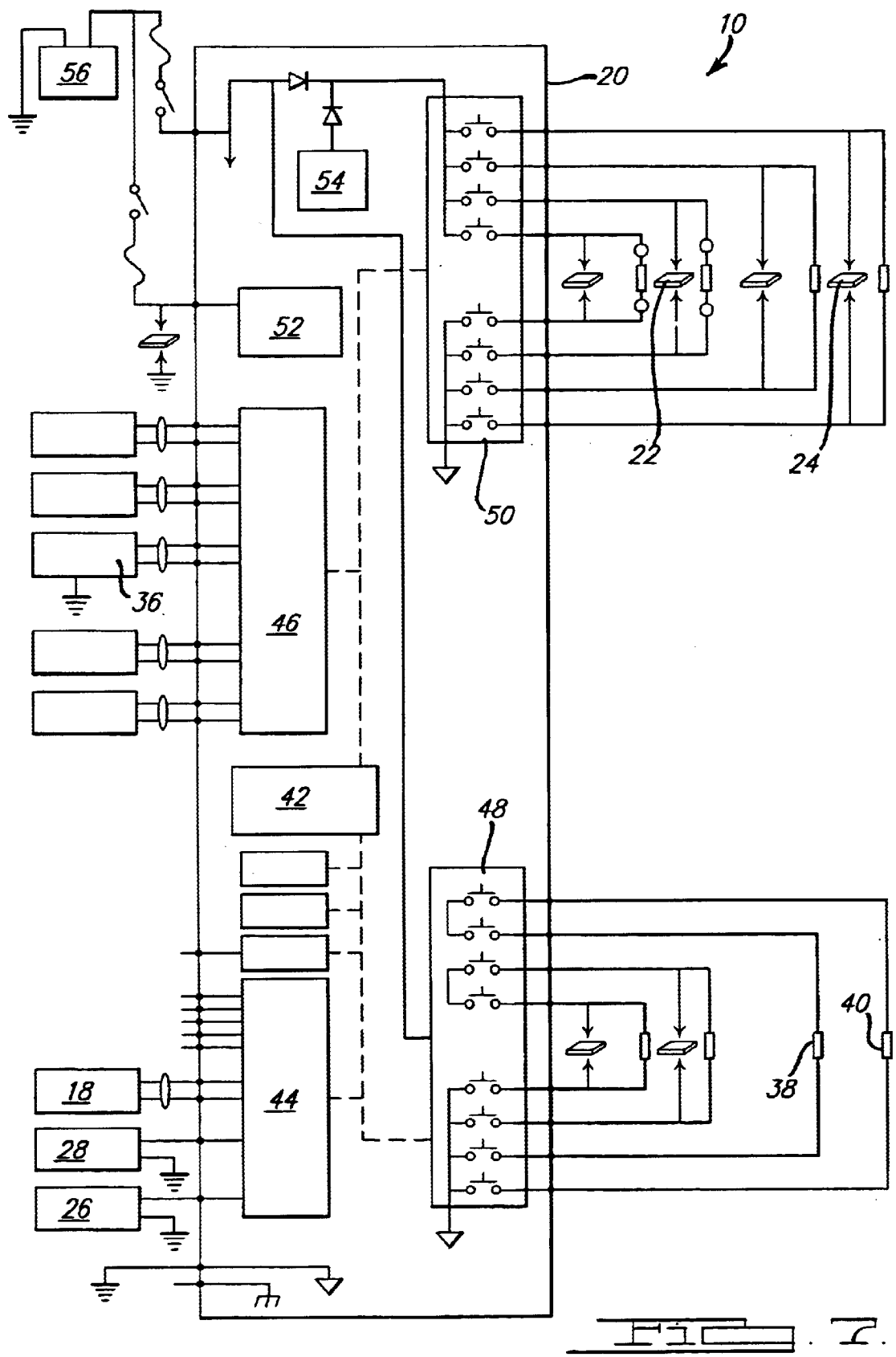
FIG. 7 is a block diagram of an electrical system for the restraint system of FIG. 1.

Referring to FIG. 7, the electronic controller 20 is shown. The electronic controller 20 includes a microprocessor 42 and memory (not shown). The electronic controller 20 includes interface circuitry 44 and 46 for the sensors previously described. The electronic controller 20 also includes input/output circuitry 48 and 50 for the output devices previously described. The electronic controller 20 also includes a lamp driver circuitry 52 and an energy reserve 54. The electronic controller 20 is powered by a source of power such as a vehicle battery 56. It should be appreciated that the electronic controller 20 may include other circuitry for interfacing with other sensors and for providing input/output information to other devices.

Figure 8:
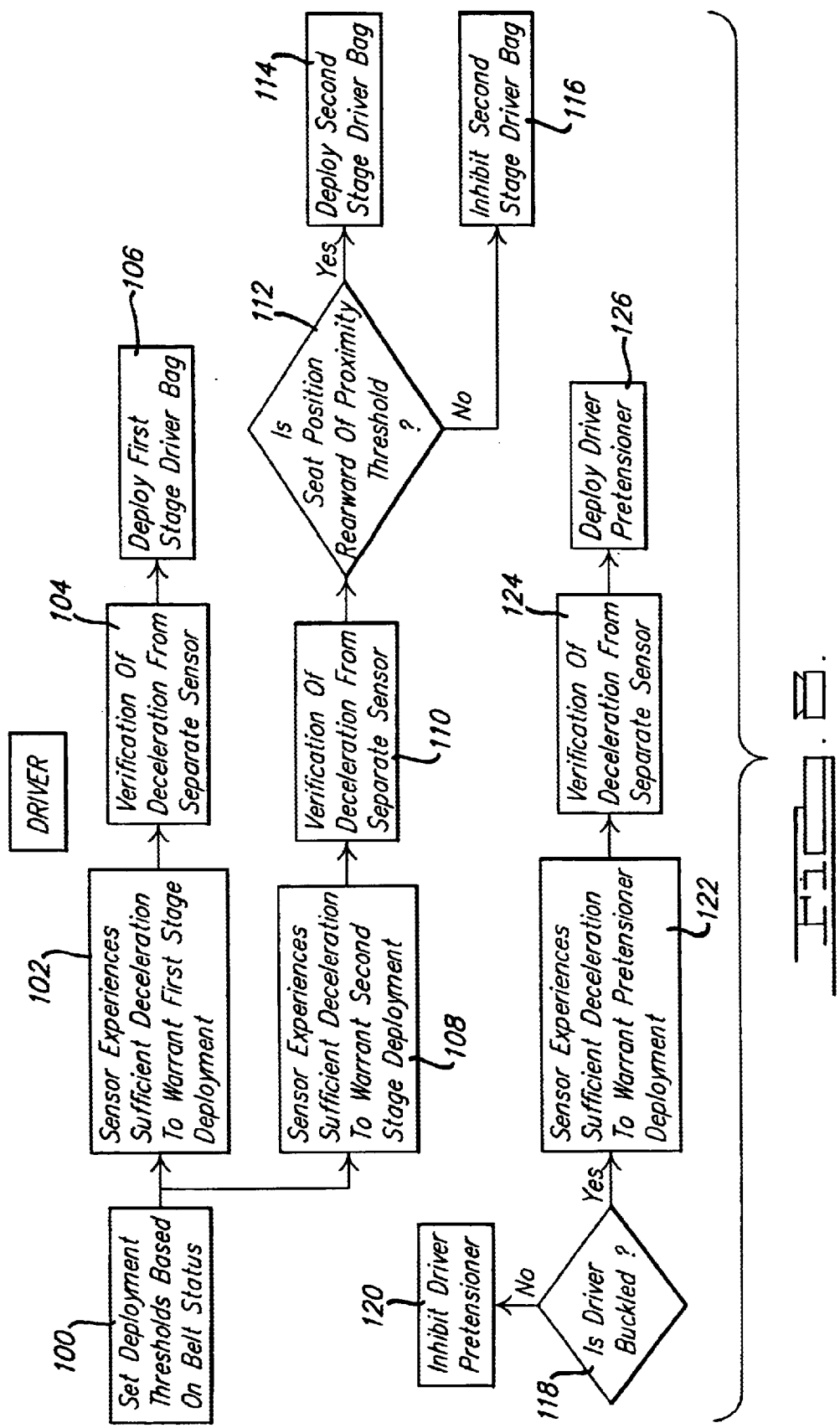
FIG. 8 is a flowchart of a method, according to the present invention, used with the restraint system of FIG. 1.
Figure 9:
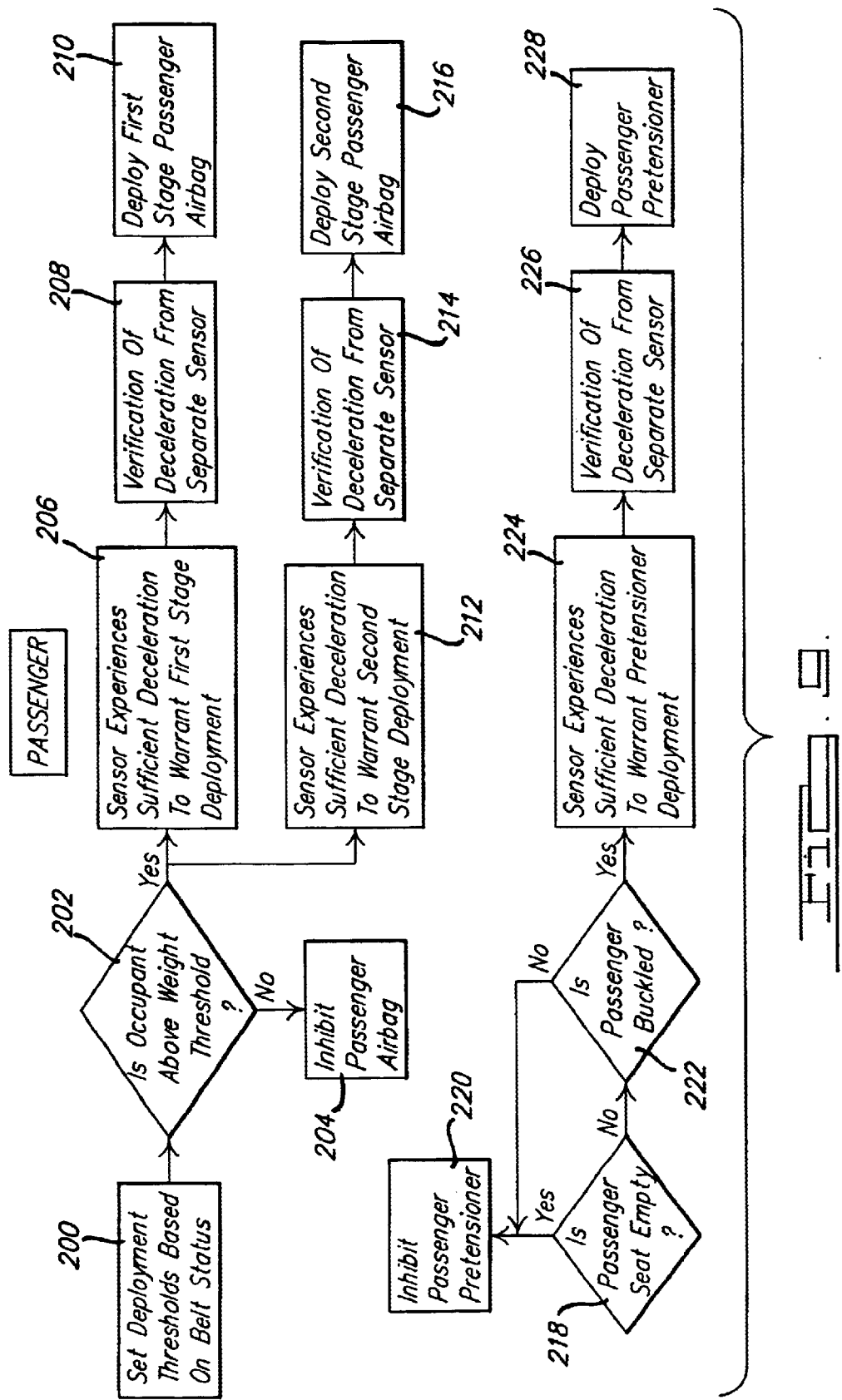
FIG. 9 is a flowchart of a method, according to the present invention, used with the restraint system of FIG. 1.

Referring to FIGS. 8 and 9, a method, according to the present invention, of deploying an inflatable restraint such as the air bag 23,35 of the restraint system 10 is shown. In FIG. 8, the method is illustrated for the driver side air bag 23 and in FIG. 9, the method is illustrated for the passenger side air bag 25. As illustrated in FIG. 8, the method starts in block 100 and sets deployment thresholds based on belt status of the driver side seat restraint of the restraint system 10. The electronic controller 20 sets and stores the deployment thresholds in memory based on whether the seat belt buckle switch 26 is open or closed. The method advances to block 102 and determines whether the impact severity sensor 32 experiences sufficient deceleration to warrant first stage deployment of the air bag 23 via the inflator 22. The controller 20 determines whether the G's from the sensor 32 are above a predetermined threshold as illustrated in FIG. 6. If so, the method advances to block 104 and verifies the deceleration from a separate sensor such as the electronic satellite sensor 36. The method then advances to block 106 and deploys the first stage of the driver side air bag 23 via the inflator 22.

From block 100, the method advances to block 108 and determines whether the impact severity sensor 32 experiences sufficient deceleration to warrant second stage deployment of the air bag 23 via the inflator 22. The electronic controller 20 determines whether the impact severity sensor 32 experiences sufficient deceleration to warrant deployment. If so, the method advances to block 110 and verifies deceleration from a separate sensor such the satellite sensor 36. The method then advances to block 112 and determines whether the seat position of the driver side seat 14 is rearward of a predetermined proximity or deployment threshold such as a seat track position sensor setting. The controller 20 determines what position the driver side seat 14 is relative to the seat track via the seat position sensor 18. If so, the method advances to block 114 and deploys the second stage of the driver side air bag 23 via the inflator 22. If not, the method advances to block 116 and inhibits deployment of the second stage of the driver side air bag 23. It should be appreciated that the method uses deceleration from two locations on the vehicle.

Concurrently, in block 118, the method determines whether the driver is buckled. The controller 20 determines whether the seat belt buckle switch 26 is open or closed, as previously described, for an unbuckled state and buckled state, respectively. If the driver is not buckled, the method advances to block 120 and inhibits the driver side pretensioner 38. If the driver is buckled, the method advances to block 122 and determines whether the impact severity sensor 32 experiences sufficient deceleration to warrant pretensioner deployment. If so, the method advances to block 124 and verifies deceleration from a separate sensor such as the satellite sensor 36. The method then advances to block 124 and deploys the driver side pretensioner 38. It should be appreciated that blocks 104, 110, and 124 may be optional.

As illustrated in FIG. 9, the method starts in block 200 and sets deployment thresholds based on belt status of the passenger side restraint of the restraint system 10. The electronic controller 20 determines whether the seat belt buckle switch 28 is open or closed. The method advances to block 202 and determines whether the occupant is above a weight deployment threshold. The controller 20 determines if the weight is above a first threshold and below a second threshold via the weight sensor 30. If not, the method advances to block 204 and inhibits deployment of the passenger side air bag 25. If so, the method advances to block 206 and determines whether the impact severity sensor 32 experiences sufficient deceleration to warrant first stage deployment of the air bag 25 via the inflator 24. If so, the method advances to block 208 and verifies deceleration from a separate sensor such as the satellite sensor 36. The method then advances to block 210 and deploys the first stage of the passenger side air bag 25 via the inflator 24.

From block 202, the method advances to block 212 and determines whether the impact severity sensor 32 experiences sufficient deceleration to warrant second stage deployment of the air bag 25 via the inflator 24. If so, the method advances to block 214 and verifies deceleration from a separate sensor such as the satellite sensor 36. The method then advances to block 216 and deploys the second stage of the passenger side air bag 25 via the inflator 24.

The method advances to block 218 and determines whether the passenger seat 14 is empty. The controller 20 determines whether the weight sensor 30 is below a first threshold. If so, the method advances to block 220 and inhibits the passenger side pretensioner 40. If so, the method advances to block 222 and determines whether the passenger is buckled. The controller 20 determines whether the seat belt buckle switch 26 is open or closed. If not, the method advances to block 220 previously described. If so, the method advances to block 224 and determines whether the impact severity sensor 32 experiences sufficient deceleration to warrant pretensioner deployment. If so, the method advances to block 226 and verifies deceleration from a separate sensor such as the satellite sensor 36. The method then advances to block 228 and deploys the passenger side pretensioner 40. The conditions for deployment of the pretensioners 38 and 40 and inflatable restraints 23 and 25 based on sensor thresholds reached are indicated by an "X" in Table 1 illustrated in FIG. 10. It should be appreciated that blocks 208, 214, and 226 may be optional.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A restraint system for a motor vehicle comprising:

a plurality of sensors for sensing vehicle conditions of restraint deployment thresholds, said sensors including a first sensor for sensing deceleration from a first location and a second sensor for sensing the deceleration from a second location;

an electronic controller electrically connected to said first sensor and said second sensor for determining whether said first sensor and said second sensor experience sufficient deceleration;

a driver side air bag and a passenger side air bag operatively connected to said electronic controller for deployment thereby in a first stage if the deceleration warrants a first stage deployment and in a second stage if the deceleration warrants a second stage deployment;

a seat position sensor electrically connected to said electronic controller for sensing whether a driver side seat is rearward of a predetermined proximity and allowing said electronic controller to deploy the second stage of the driver side air bag if the driver side seat is rearward of the predetermined proximity; and a weight sensor electrically connected to said electronic controller for sensing whether an occupant is above a weight deployment threshold and allowing said electronic controller to deploy the first stage of the passenger side air bag if the weight of the occupant is above the weight deployment threshold.

2. A restraint system as set forth in claim 1 including a seat belt pretensioner electrically connected to said electronic controller.

3. A restraint system as set forth in claim 1 including an inflator electrically connected to said electronic controller and operatively connected to each of said driver side air bag and said passenger side air bag.

4. A restraint system as set forth in claim 1 including an air bag status light for indicating whether said passenger side air bag is activatable.

5. A restraint system as set forth in claim 1 wherein said sensors include a seat belt buckle switch for sensing whether a seat belt restraint is buckled.

6. A restraint system as set forth in claim 1 wherein said sensors include an impact severity sensor for sensing severity of a vehicle impact.

7. A method of deploying a driver side inflatable restraint and a passenger side inflatable restraint of a restraint system for a vehicle, said method comprising:

sensing a position of a driver side seat;

sensing weight in a passenger side seat;

determining whether a first sensor experiences sufficient deceleration to warrant either a first stage deployment or a second stage deployment of the driver side inflatable restraint and the passenger side inflatable restraint;

verifying the deceleration from a separate second sensor;

determining whether the position of the driver side seat is rearward of a predetermined proximity;

deploying a first stage of the driver side inflatable restraint if the deceleration warrants a first stage deployment and deploying a second stage of the driver side inflatable restraint if the deceleration warrants a second stage of deployment and the position of the driver side seat is rearward of the predetermined proximity;

determining whether the weight of the passenger side seat is above a predetermined threshold; and deploying a first stage of the passenger side inflatable restraint if the deceleration warrants a first stage deployment and the weight of the passenger side seat is above a predetermined threshold and deploying a second stage of the passenger side seat if the deceleration warrants a second stage of deployment.

8. A method as set forth in claim 7 including the step of deploying the second stage of the driver side inflatable restraint if the seat position is rearward of the predetermined proximity.

9. A method as set forth in claim 7 including the step of inhibiting deployment of the second stage of the driver side inflatable restraint if the seat position is not rearward of the predetermined proximity.

10. A method as set forth in claim 7 including the step of inhibiting the deployment of the passenger side inflatable restraint if the weight of the occupant is not above the predetermined threshold.

11. A method as set forth in claim 7 including the step of determining whether the occupant is buckled.

12. A method as set forth in claim 11 including the step of inhibiting a pretensioner of the restraint system if the occupant is not buckled.

13. A method as set forth in claim 7 including the step of determining whether a seat is empty.

14. A method as set forth in claim 13 including the step of inhibiting a pretensioner of the restraint system if the seat is empty.

15. A restraint system for a motor vehicle comprising:

a first sensor for sensing deceleration;

a second sensor for verifying the sensed deceleration;

a seat position sensor for sensing whether a driver side seat is rearward of a predetermined proximity;

a weight sensor for sensing whether an occupant in a passenger side seat is above a weight deployment threshold;

a driver side air bag;

a passenger side air bag; and an electronic controller electrically connected to said first sensor and said second sensor for determining whether said first sensor and said second sensor experience sufficient deceleration and operatively connected to said driver side air bag and said passenger side air bag for deployment thereby in a first stage if the deceleration warrants a first stage deployment and in a second stage if the deceleration warrants a second stage deployment and electrically connected to said seat position sensor to allow deployment of the second stage of the driver side air bag if the driver side seat is rearward of the predetermined proximity and electrically connected to said weight sensor to allow deployment of the first stage of the passenger side air bag if the weight of the occupant is above the weight deployment threshold.

* * * * *